United States Patent [19]

Piper

[11] Patent Number: 5,586,184
[45] Date of Patent: Dec. 17, 1996

[54] BATTERY LATCH FOR CELLULAR TELEPHONE

[75] Inventor: Haydn K. Piper, Hillsboro, Oreg.

[73] Assignee: Kelly Communications Group, Inc., Del.

[21] Appl. No.: 341,405

[22] Filed: Nov. 17, 1994

[51] Int. Cl.$^6$ .................................................. H04M 1/00
[52] U.S. Cl. .................................. 379/433; 379/434
[58] Field of Search ............................ 379/428, 429, 379/433, 434; 455/89, 90, 128; 292/80, 91, 76

[56] References Cited

U.S. PATENT DOCUMENTS 5,193,220  3/1993  Ichinobe et al. ...................... 455/90
5,436,969  7/1995  Kobayashi ............................. 379/433

*Primary Examiner*—Krista M. Zele
*Assistant Examiner*—Jack Chiang
*Attorney, Agent, or Firm*—Marger, Johnson, McCollom & Stolowitz PC

[57] ABSTRACT

A phone housing includes an attachment section for receiving a battery pack. A slot in the phone housing receives a latch made formed from a unitary piece of plastic. The latch inserts and locks inside the slot and is compressible inside the slot allowing the battery pack to be inserted into the attachment section. After the battery pack is seated in the attachment section, the latch springingly expands out of the slot engaging with the battery pack. The latch includes a unique combination of legs that operate as a spring and arms that serve to lock the latch inside the slot.

18 Claims, 4 Drawing Sheets

5,586,184

BATTERY LATCH FOR CELLULAR TELEPHONE

BACKGROUND OF THE INVENTION

This invention relates generally to mobile phones and more particularly to a latch assembly that locks a battery pack to a phone housing.

Mobile phones use rechargeable battery packs for operating electronic phone circuitry. These battery packs are generally large and heavy. A battery latch assembly is used to hold the battery pack to the phone housing. The battery pack must be securely attached to the phone housing so that a secure electrical contact is formed between the battery supply and the phone's electrical circuitry. However, present battery latch assemblies are either cumbersome to assemble and operate or do not hold the battery pack securely to the phone housing.

Accordingly, a need remains for a battery pack latch assembly that is easy to assembly and operate while providing secure engagement between the battery pack and the phone housing.

SUMMARY OF THE INVENTION

A phone housing includes an attachment section for receiving a battery pack and includes a front edge that contains a slot. A latch inserts and locks inside the housing slot and engages with the battery pack. The latch is compressible back into the slot allowing the battery pack to be seated into the phone housing attachment section. After the battery pack is fully seated, the latch is released. The latch springingly expands out of the slot engaging inside a channel in the battery pack.

The latch includes a front lip that extends out from the slot when the latch is in an extended condition and is recessed inside the slot when the latch is in a compressed condition. The latch also includes a pair of legs that operate as a spring holding the latch in the extended position. The legs are bendable to allow the latch to move back into the slot when the battery pack is inserted or removed from the phone housing.

The latch also includes arms that extend along the lateral sides of the latch. The arms include oppositely sloping flanges that engage with openings on opposite inside walls of the slot. The arms also operate in a springlike manner, bending toward the center of the latch while being inserted into the slot. The arms then spring back into the slot openings locking the latch securely in the slot.

The latch arms and legs join together forming shoulders which in combination with the lip guide the latch inside the slot. The latch is formed from a unitary piece of plastic, eliminating additional springs and other engagement components that are typically used in other latch assemblies.

Thus, the latch assembly provides secure attachment between the phone's battery pack and the phone housing. The latch assembly also uses a minimal number of separate parts making the assembly inexpensive to manufacture and easy to assemble and operate.

The foregoing and other objects, features and advantages of the invention will become more readily apparent from the following detailed description of a preferred embodiment of the invention which proceeds with reference to the accompanying drawings.

DETAILED DESCRIPTION

Figure 1:
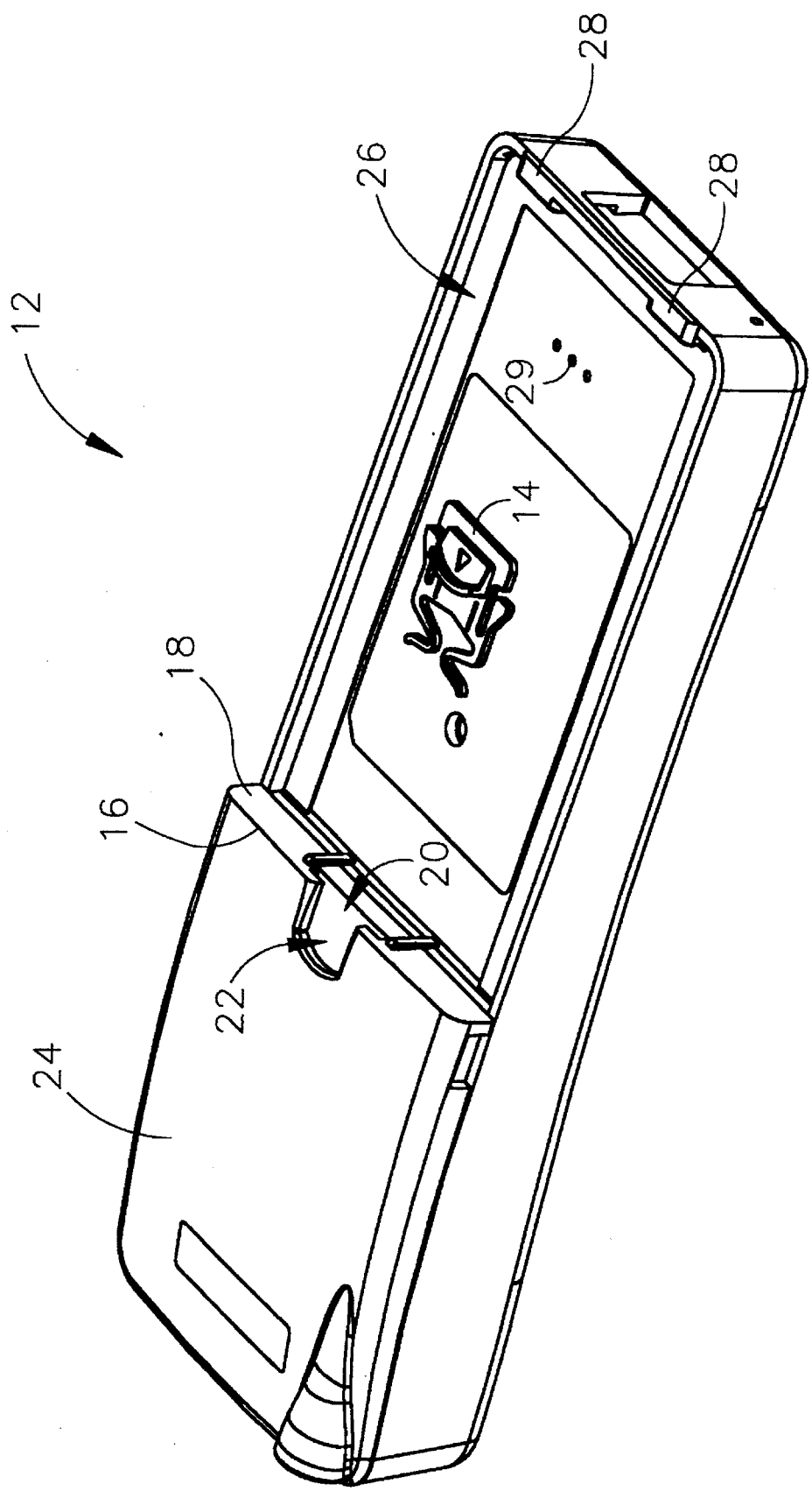
FIG. 1 is a perspective view of a back side of a cellular phone housing and a latch according to the invention.
Figure 4:
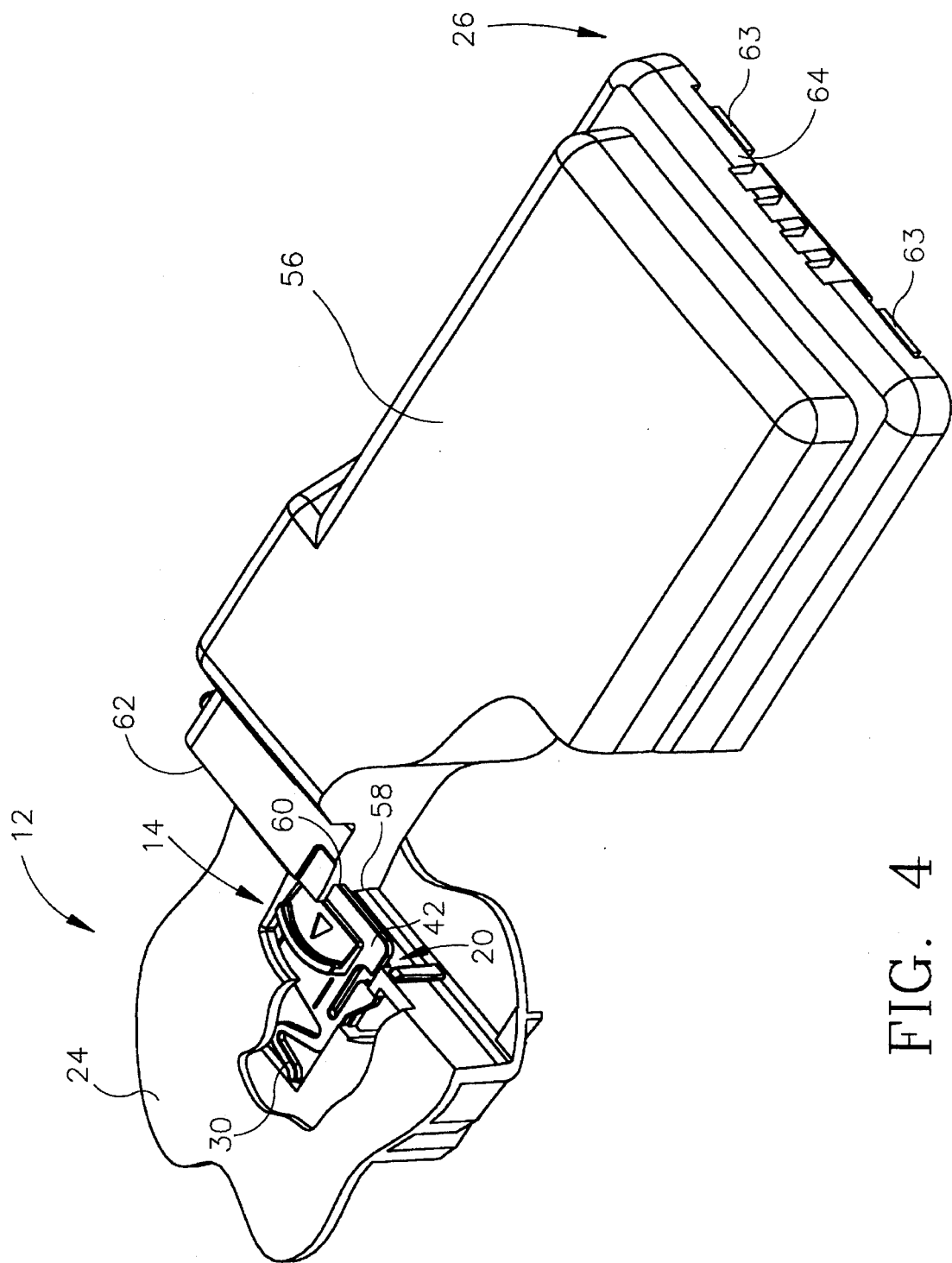
FIG. 4 is the latch shown in FIG. 3 interlocked with a battery pack.

FIG. 1 is a perspective view of a back side of a cellular phone housing 12 and a latch 14. The phone housing includes an edge 16 having a front face 18. The edge 16 defines a front end of a an attachment section 26 that receives a battery pack 56 (FIG. 4). The attachment section includes ears 28 that interlock to a back end of the battery pack 56. A set of electrical contacts 29 couple electrical circuitry in the phone housing 12 with a battery in the battery pack 56.

The phone housing 12 includes a top face 24 that extends from a front end of the phone housing 12 to the front end of the attachment section 26. A slot 20 extends horizontally into the front face 18. A cavity 22 extends vertically downward from the top face 24 into the slot 20. The latch 14 is a unitary piece of molded plastic that is slidingly insertable and lockable into the slot 20.

Figure 2:
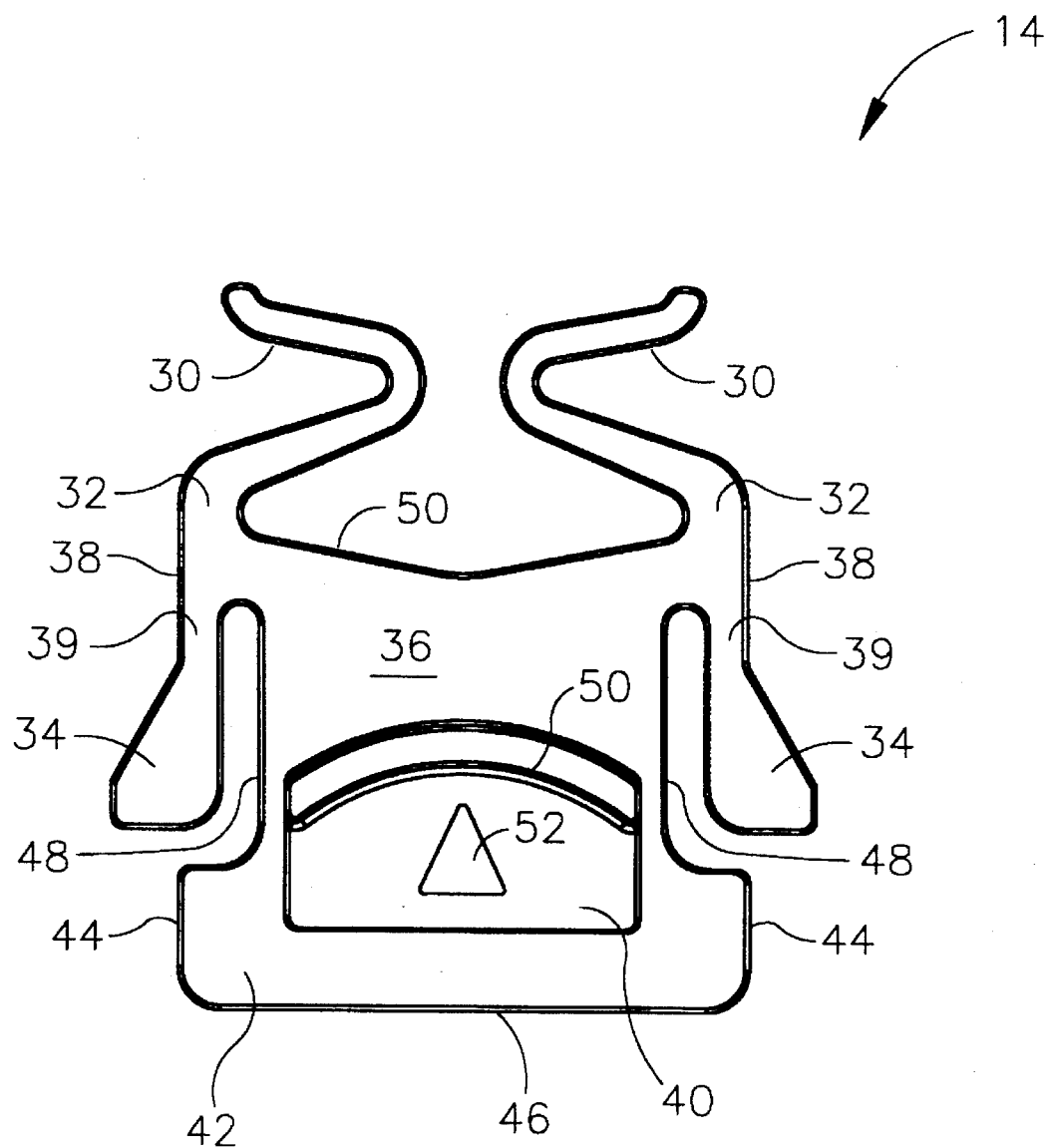
FIG. 2 is an enlarged top view of the latch shown in FIG. 1.

FIG. 2 is an enlarged top view of the latch 14 shown in FIG. 1. The latch 14 includes a center section 36 having a front end joined to a lip 42, a rear end 50 and lateral sides 48. Lip 42 extends forward and laterally from the front end of center section 36 and includes lateral sides 44 and a front edge 46.

The latch 14 includes a pair of opposed "V-shaped" legs 30 that extend from the rear end 50 of the center section 36. The legs 30 are shown in an extended "uncompressed" position and are springingly bendable toward the center section 36. The legs 30 when bent inward toward center section 36 are then springingly reformable back into the extended position shown in FIG. 2.

The latch includes arms 39 that extend along the sides 48 of the center section 36. The arms 39 and legs 30 join together forming shoulders 32 having outside edges 38. The outside edges 38 and the lateral edges 44 of the lip 42 are in co-linear alignment forming opposite latch sides. The distance between the opposite latch sides is substantially equal to a given width of slot 20 (FIG. 1).

The arms 39 include oppositely inclining flanges 34 that slope down and away from edges 38. Each arm 39 also operates in a springlike manner. For example, each arm 39 is bendable inward toward the center section 36. The arms 39 then springingly reform back into a parallel alignment with the opposite lateral sides 48 of center section 36. The arms 39 are used to lock latch 14 inside slot 20 as will be described below.

The latch 14 further includes a pad 40 that protrudes upward from center section 36. The pad 40 includes a front rim 50 that extends above pad 40 and a direction legend 52.

Figure 3:
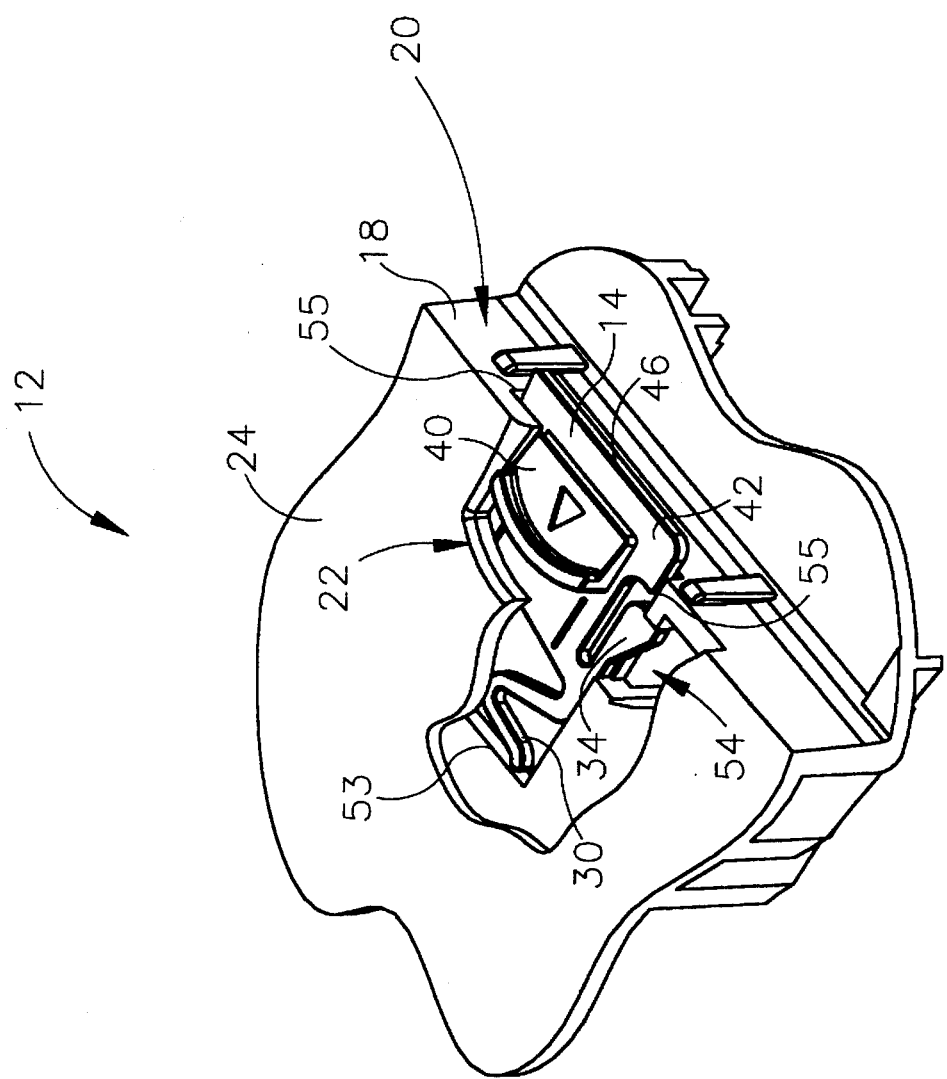
FIG. 3 is an expanded cutaway view of the latch shown in FIG. 2 inserted into a slot in the phone housing.

FIG. 3 is an expanded cutaway view of the latch 14 shown in FIG. 2 inserted into the slot 20 of phone housing 12. The latch 14 is slidingly inserted in a horizontal direction into slot 20. As latch 14 is inserted, inside walls 55 of slot 20 press against flanges 34, pushing arms 39 toward the center section 36. As latch 14 is inserted further, flanges 34 move into openings 54 in the inside walls 55. The arms 39 then springingly bend back into their original parallel alignment locking the latch 14 into slot 14. In the locked position, legs 30 press against a back end 53 of slot 20 holding lip 42 out the front end of slot 20. The pad 40 extends upward through cavity 22 and is used for pushing the latch 14 back into slot 20.

When pad 40 is pushed forward, legs 30 bend toward center section 36 allowing lip 42 to move into slot 20. When latch 14 is compressed fully back into slot 20, the front edge 46 of lip 42 is substantially flush with front face 18 of phone housing 12.

When pressure is released from pad 40, legs 30 bend springingly back into their original extended position as shown in FIG. 2. Lip 42 then moves out of slot 20 into the extended position shown in FIG. 3. The outer edges 38 of shoulder 32 and the outer edges 44 of lip 42 guide the latch 14 along the inside walls 55 of slot 20. Thus, the latch 14 is held in a snug alignment inside slot 20.

FIG. 4 is a cutaway perspective view showing the latch 14 engaged with a battery pack 56. The battery pack includes a top end 62 and a bottom end 64. The bottom end 64 contains a pair of notches 63. The top end 62 includes an inwardly sloping top face 58 that is located below a channel 60.

The battery pack 56 is initially inserted into attachment section 26 (FIG. 1) by first engaging notches 63 with ears 28 (FIG. 1). The top end 62 of battery pack 56 is then rotated vertically downward onto lip 42. The inclining top face 58 pushes lip 42 into slot 20, in turn, bending legs 30 toward center section 36 (FIG. 2). Lip 42 is correspondingly moved back into slot 20 allowing battery pack 56 to move further into attachment section 26.

When the top end 62 of battery pack 56 is fully seated into attachment section 26, channel 60 aligns with slot 20. Legs 30 then bend in a springlike manner back into their extended position. Lip 42, in turn, moves back out of slot 20 into channel 60 locking battery pack 56 to phone housing 12.

To disengage battery pack 56, pad 40 is moved back toward slot 20, again bending legs 30 toward center section 36. Lip 42 moves back into slot 20, disengaging from channel 60. Battery pack 56 is then lifted vertically upward and removed from attachment section 26. When pad 40 is released, latch 14 springs back into the extended position where lip 42 extends out the front end of slot 20.

The battery latch assembly uses a simple unitary latch mechanism for securing the battery pack in phone housing 12. No additional mechanical components, such as a metal spring, have to be used with latch 14. Thus, the latch assembly uses fewer parts and is easier to assemble and less expensive to manufacture.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A latch for securing a battery pack to a mobile telephone, comprising:

a center section having a front end, a back end, opposite lateral sides and a top face;

a lip extending from the front end of the center section for engagement with the battery pack; and one or more legs each extending rearwardly from the back end of the center section in an extended position, each one of said legs compressibly foldable upon itself into a compressed condition and springingly reformable back into said extended position, the center section, lip and legs formed from a unitary piece of molded plastic.

2. A latch according to claim 1 including arms extending laterally out from the opposite lateral sides of the center section.

3. A latch according to claim 2 wherein each arm is formed from the unitary piece of molded plastic.

4. A latch according to claim 3 wherein the arms include opposite inclining flanges that slope downward and away from the lateral sides of the center section.

5. A latch according to claim 2 wherein each leg is joined together with an associated arm at the back end of the center section forming opposite lateral guide shoulders each having an outside edge.

6. A latch according to claim 1 wherein the legs extend from the opposite lateral sides of the back end, each one of the legs including a first section angled downward underneath the back end of the center section and inward toward one of said legs on the opposite side and a second section that extends below the first section, the second section angled downward underneath the back end of the second section and outward away from the one of said legs on the opposite side.

7. A latch according to claim 1 including a push pad extending upward from the top face of the center section.

8. A latch according to claim 5 wherein the lip comprises lateral edges in co-linear alignment with the outside edges of the guide shoulders.

9. A battery pack latch assembly for a mobile telephone, comprising:

a battery pack having a top end, a bottom end and sides;

a phone housing including an attachment section extending along a longitudinal plane of the phone housing for receiving the battery pack, the attachment section having an edge;

a slot extending in a lengthwise direction through the edge of the retainment section; and a latch slidingly insertable and lockable into the slot, the latch including at least one leg molded from a bottom end of the latch and foldable upon itself inside the slot into a compressed condition allowing insertion of the battery pack into the attachment section, the leg springingly expandable from the compressed condition forcing the latch partially back out of the slot thereby engaging with the battery pack.

10. An assembly according to claim 9 wherein the latch comprises the following;

a center section having a front end, a rear end and lateral sides; and a lip having lateral edges and a front edge, the front edge of the lip extending out from the slot when the latch is expanded and aligned substantially flush with the front face of the attachment section when the latch is compressed.

11. An assembly according to claim 10 wherein the latch includes arms that extend along the lateral sides of the center section, the arms compressible in a lateral direction perpendicular to the lengthwise direction of the slot.

12. An assembly according to claim 11 including multiple legs joined to the bottom end of the center section, the arms and legs joined together forming shoulders having outside edges, the outside edges of the shoulders and the lateral edges of the lip forming opposite sides separated by a distance substantially equal to a given slot width.

13. An assembly according to claim 12 wherein the arms include oppositely inclining flanges that slope away from the outside edges of the shoulders.

14. An assembly according to claim 9 including a cavity that extends down from a top face of the phone housing into the slot.

15. An assembly according to claim 14 wherein the latch includes a pad that protrudes upward into the cavity.

16. An assembly according to claim 10 wherein the latch center section, lip, leg and arms are formed from a unitary piece of plastic.

17. A method for attaching and detaching a battery pack to a mobile phone housing, comprising:

forming a latch having one or more legs with a unitary piece of molded plastic;

forming an attachment section in the housing having a front edge containing a slot;

slidingly inserting the latch into the slot springingly compressing the latch in a lateral direction;

urging the latch further into the slot decompressing the latch allowing the latch to springingly expand in the lateral direction and lock into the slot;

inserting the battery pack vertically downward into the attachment section urging the latch further into the slot springingly each one of the latch legs upon itself; and seating the battery pack further vertically downward into the attachment section unfolding each one of the latch legs allowing the latch to springingly expand outward from the slot engaging with the battery pack.

18. A method according to claim 17 wherein compressing the latch in the lateral direction comprises the following steps:

molding arms on opposite lateral sides of the latch body; and compressing the arms with opposite side walls of the slot toward the latch body.

* * * * *